US010688504B2

(12) United States Patent
Krishnamurthy et al.

(10) Patent No.: US 10,688,504 B2
(45) Date of Patent: Jun. 23, 2020

(54) APPARATUS AND PROCESS FOR GAS-SOLIDS SEPARATION

(71) Applicant: UOP LLC, Des Plaines, IL (US)

(72) Inventors: Sujay R. Krishnamurthy, Hoffman Estates, IL (US); Roger L. Throndson, Schaumburg, IL (US); James W. Althoff, Chicago, IL (US); Richard A. Johnson, II, Algonquin, IL (US)

(73) Assignee: UOP LLC, Des Plaines, IL (US)

( * ) Notice: Subject to any disclaimer, the term of this patent is extended or adjusted under 35 U.S.C. 154(b) by 166 days.

(21) Appl. No.: 15/721,884

(22) Filed: Sep. 30, 2017

(65) Prior Publication Data

US 2019/0099766 A1    Apr. 4, 2019

(51) Int. Cl.
| | |
|---|---|
| *B01D 45/12* | (2006.01) |
| *B04C 3/04* | (2006.01) |
| *B01D 45/16* | (2006.01) |
| *B01D 45/14* | (2006.01) |
| *B04C 3/06* | (2006.01) |
| *B04C 9/00* | (2006.01) |
| *B01J 8/00* | (2006.01) |
| *B04C 3/00* | (2006.01) |

(52) U.S. Cl.
CPC .............. *B04C 3/04* (2013.01); *B01D 45/12* (2013.01); *B01D 45/14* (2013.01); *B01D 45/16* (2013.01); *B04C 3/06* (2013.01); *B04C 9/00* (2013.01); *B01J 8/0055* (2013.01); *B04C 2003/006* (2013.01); *B04C 2009/007* (2013.01)

(58) Field of Classification Search
CPC .... B04C 3/04; B04C 9/00; B04C 3/06; B04C 2003/006; B04C 2009/007; B01D 45/14; B01D 45/16; B01D 45/12; B01J 8/0055
See application file for complete search history.

(56) References Cited

U.S. PATENT DOCUMENTS

| | | | |
|---|---|---|---|
| 3,541,766 A | 11/1970 | Wilson | |
| 3,893,914 A * | 7/1975 | Bobo | B04C 3/06 209/718 |
| 3,895,930 A * | 7/1975 | Campolong | B01D 45/16 55/394 |
| 4,783,204 A * | 11/1988 | Roarty | B01D 45/16 122/34 |
| 5,690,709 A | 11/1997 | Barnes | |
| 6,376,732 B1 * | 4/2002 | Ngan | B01D 45/16 208/308 |
| 6,673,133 B2 | 1/2004 | Sechrist et al. | |
| 6,797,026 B2 | 9/2004 | Sechrist et al. | |
| 6,902,593 B2 | 6/2005 | Miller et al. | |

(Continued)

FOREIGN PATENT DOCUMENTS

AU    2009100485 A4    9/2009

OTHER PUBLICATIONS

Jacobsson et. al., Experimental and Computational Fluid Dynamics Investigation of the Flow in and around Once-Through Swirl Tubes, Ind. Eng. Chem. Res. 2006, 45, 6525-6530.

*Primary Examiner* — Dung H Bui
(74) *Attorney, Agent, or Firm* — Paschall & Associates, LLC; James C. Paschall

(57) ABSTRACT

A process and apparatus of a gas-solids separator are provided in which a cap is disposed across an upstream end of swirl blades in a cyclonic separator to protect the blades from erosion by fast traveling solids.

13 Claims, 3 Drawing Sheets

(56) References Cited

U.S. PATENT DOCUMENTS

| | | | |
|---|---|---|---|
| 7,316,733 B1 | 1/2008 | Hedrick et al. | |
| 7,547,427 B2 | 6/2009 | Walker et al. | |
| 7,708,790 B2 | 4/2010 | Castagnos | |
| 8,287,613 B2 | 10/2012 | Chen et al. | |
| 8,747,504 B2 | 6/2014 | Brandner et al. | |
| 9,475,069 B2* | 10/2016 | Cabezas Morales | B04C 5/06 |
| 9,643,116 B2 | 5/2017 | Krishnamurthy | |
| 2004/0195706 A1* | 10/2004 | Konijn | B01D 3/20 261/79.2 |
| 2004/0256312 A1* | 12/2004 | Gomez | B01D 19/0052 210/512.3 |
| 2008/0251419 A1* | 10/2008 | Stein | B01D 1/14 208/106 |
| 2010/0072121 A1* | 3/2010 | Maier | B01D 45/16 210/196 |
| 2010/0140187 A1* | 6/2010 | Schook | B04C 3/06 210/788 |
| 2013/0139481 A1* | 6/2013 | Sakai | B04C 5/04 55/396 |
| 2013/0152522 A1* | 6/2013 | Stippich | B01D 45/16 55/398 |
| 2013/0152525 A1* | 6/2013 | Brandner | B01D 45/16 55/447 |
| 2013/0199137 A1* | 8/2013 | Hallgren | B01D 45/16 55/393 |
| 2014/0007770 A1* | 1/2014 | Gaebler | B01D 45/08 95/272 |
| 2014/0299540 A1* | 10/2014 | Ackermann | B04C 3/06 210/512.3 |
| 2014/0373490 A1* | 12/2014 | Wuebbeling | B01D 45/16 55/345 |
| 2015/0273483 A1* | 10/2015 | Krishnamurthy | B04C 3/06 95/269 |
| 2016/0206169 A1* | 7/2016 | Hyun | A47L 9/1633 |
| 2017/0320069 A1* | 11/2017 | Whitehead | B04C 3/06 |

* cited by examiner

APPARATUS AND PROCESS FOR GAS-SOLIDS SEPARATION

FIELD

The field relates to gas-solids separators well-suited for usage within fluid catalytic cracking units.

DESCRIPTION OF RELATED ART

Fluid catalytic cracking (FCC) is a widely-utilized process wherein a heavy hydrocarbon feed is contacted with a catalyst under elevated temperature within a main reactor to yield lighter hydrocarbon products. During the cracking process, catalyst activity gradually decreases due to the deposition of coke on the catalyst granules. To restore catalyst activity, the spent catalyst is continually withdrawn from the main reactor through a spent catalyst standpipe and supplied to a catalyst regenerator in which combustion occurs to burn-off the coke deposits. The regenerated catalyst is then recycled to the riser of the main reactor to again contact the heavy hydrocarbon feed and repeat the cracking process. The flue gas generated as a result of combustion within the catalyst regenerator is collected within an upstream manifold and, depending upon flue gas temperature, is typically either supplied to a stack for exhaustion to atmosphere or expanded through one or more turbines for power recover.

Catalyst particles inevitably become entrained within the flue gas generated during combustion within the catalyst regenerator. The catalyst regenerator is often equipped with first and second stage cyclone separators, which are collectively able to remove larger catalyst particles having an average diameter exceeding about 50 microns and often approaching or exceeding 100 microns from the flue gas stream with relative ease. However, smaller catalyst particles having an average diameter less than about 50 microns often remain entrained in the flue gas stream discharged from the catalyst regenerator. These smaller catalyst particles resemble fine grains of sand and are commonly referred to as "catalyst fines." If not removed from the flue gas stream, at least in large part, the abrasive catalyst fines may gradually erode components downstream of the catalyst regenerator, such as the blades of a turbine included within a power recovery unit. It may thus be desirable to remove the catalyst fines to prevent or at least minimize such erosion and/or to reduce the quantity of particulate matter exhausted to atmosphere in satisfaction of prevailing environmental regulations.

Solids-gas separators, commonly referred to as a third stage separator or "TSS", have been developed to remove catalyst fines from the flue gas stream discharged from catalyst regenerator. One of the most effective types of TSS's includes a vessel containing a number of uniflow cyclonic separators, as developed and commercially marketed by UOP, LLC, headquartered in Des Plaines, Ill. An individual uniflow cyclonic separator may be able to remove a significant amount of particulate fines from a flue gas stream directed through the separator. It has been observed that, over the course of continuous operation over a prolonged time period on the order of several years, considerable erosion may occur within the cyclonic separator. If sufficiently severe, such erosion may require localized repair or replacement of the entire cyclonic separator, which may necessitate shutdown of the TSS and possibly the FCC unit as a whole.

It is thus desirable to provide embodiments of a gas-solids separator suitable for usage in a third stage separator within a fluid catalyst cracking unit and having increased resistance to erosion and reduced maintenance requirements as compared to conventional third stage separators.

SUMMARY OF THE INVENTION

Embodiments of a gas-solids separator for separating particulate matter from a gas stream are provided. A cap is provided upstream of the cyclonic separator to prevent catalyst fines from directly contacting swirl blades in the separator.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
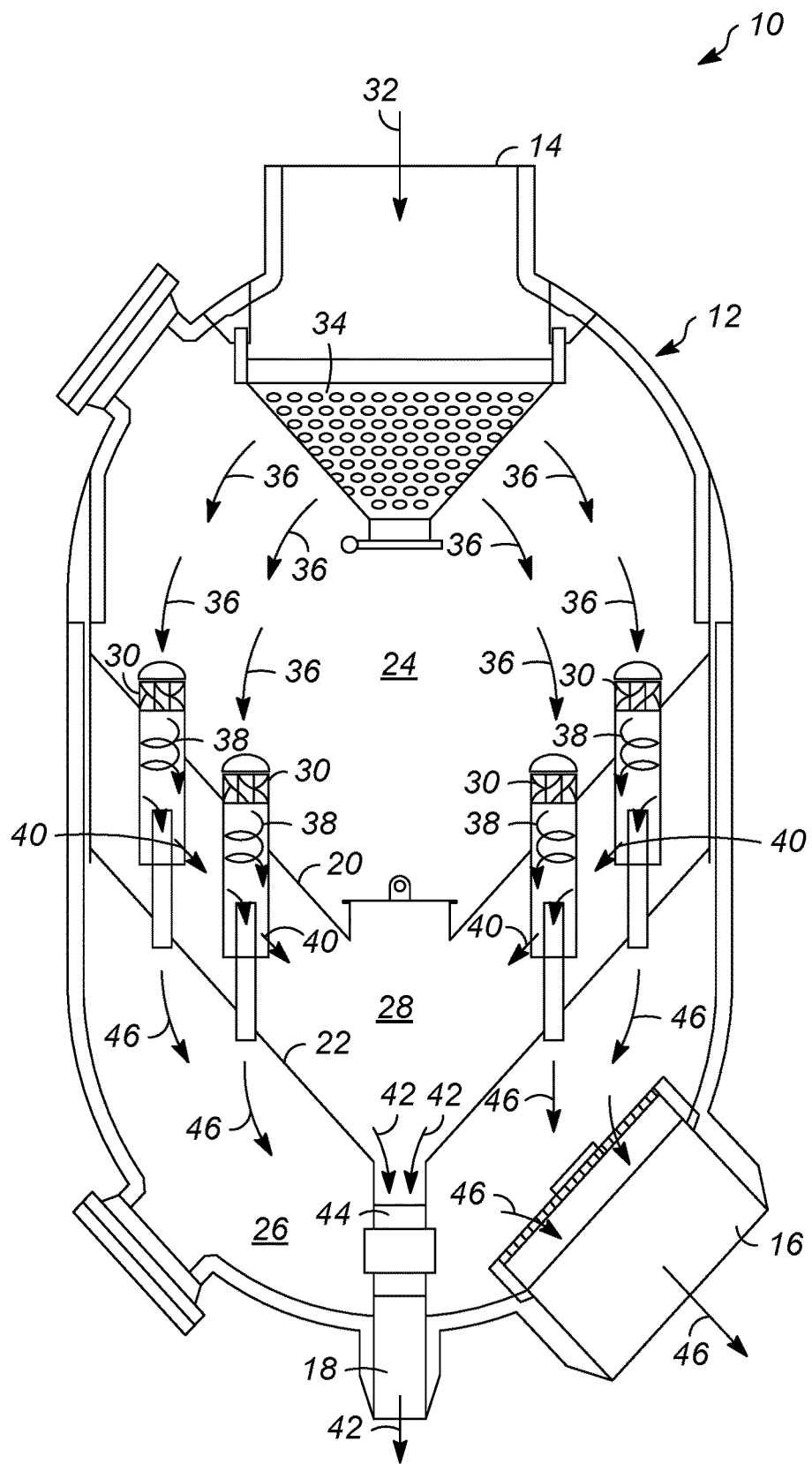
FIG. 1 is a simplified cross-sectional view of a gas-solids separator including a plurality of cyclonic separators and illustrated in accordance with an exemplary embodiment of the present invention.

FIG. 1 is a simplified cross-sectional view of a gas-solids separator 10 illustrated in accordance with an exemplary embodiment of the present invention. During operation, gas solids separator 10 removes particulate matter entrained in a gas stream to, for example, reduce the quantity of particulate matter exhausted to the atmosphere and/or to minimize erosion of downstream equipment, such one or more turbines included within a power recovery expander unit. Gas solids separator 10 is especially well-suited for usage as a separator included within a fluid catalytic cracking ("FCC") unit and, specifically, as third stage separator ("TSS"), which receives a flue gas stream from an FCC catalyst regenerator entrained with relatively fine particles of the catalyst utilized in the FCC process. An example of a FCC system in which the separator 10 may be employed as a TSS is described in U.S. Pat. No. 6,673,133 B2. This notwithstanding, it is emphasized that the separator 10 can be utilized within any application, system, or platform wherein it is desired to remove particulate matter or debris from a gas stream utilizing a continuous, low maintenance separation process.

With reference to the exemplary embodiment illustrated in FIG. 1, gas-solids separator 10 includes a vessel 12 having a flue gas inlet 14, a clean gas outlet 16, and an entrained solids outlet 18. Upstream and downstream tubesheets 20 and 22 are mounted within the shell of vessel 12 and define therewith a flue gas chamber 24, a clean gas chamber 26, and an entrained solids chamber 28 between flue gas chamber 24 and clean gas chamber 26. Flue gas chamber 24, clean gas chamber 26, and entrained solids chamber 28 are fluidly coupled to flue gas inlet 14, clean gas outlet 16, and entrained solids outlet 18, respectively. Upstream tubesheet 20 thus bounds the downstream section of flue gas chamber 24; upstream and downstream tubesheets 20 and 22 bound upstream and downstream sections of entrained solids chamber 28, respectively; and downstream tubesheet 22 bounds the upstream section of clean gas chamber 26. Stated differently, upstream tubesheet 20 partitions flue gas chamber 24 and entrained solids chamber 28, while downstream tubesheet 22 partitions entrained solids chamber 28 and clean gas chamber 26. As shown in FIG. 1, upstream and downstream tubesheets 20 and 22 may each assume the form of a generally conical wall, which extends radially inward from an inner circumferential surface of vessel 12 to divide the interior of vessel 12 into chambers 24, 26, and 28 as just described.

A plurality of cyclonic separators 30 are mounted within vessel 12 and extend from upstream tube sheet 20 to the downstream tube sheet 22. As a specific and non-limiting example, gas-solids separator 10 may include 8 to 200 such separators 30, which are circumferentially distributed around the longitudinal axis of vessel 12 to produce a separation manifold. The longitudinal axes of cyclonic separators 30 may be substantially parallel with the longitudinal axis of vessel 12; and, in embodiments in which vessel 12 is vertically oriented, separators 30 may likewise be vertically oriented. Cyclonic separators 30 thus extend in a generally vertical direction across entrained solids chamber 28 to allow fluid communication from flue gas chamber 24 to clean gas chamber 26. In addition, each cyclonic separator 30 includes one or more unidirectional flow orifice (referred to herein as "check valve openings"), which fluidly couple flue gas chamber 24 to the entrained solids chamber 28 to permit the removal of entrained solids from the gas stream, as described in detail below.

During operation of gas-solids separator 10, a flue gas stream 32 is supplied to flue gas inlet 14 by, for example, an FCC regenerator upstream of separator 10. As indicated above, flue gas stream 32 carries particulate matter; and, in the case of an FCC system specifically, gas stream 32 is laden with relatively small catalyst particles having an average diameter less than 50 microns commonly referred to as "catalyst fines." As shown in FIG. 1, a conical perforated diffuser 34 may be mounted within an upstream portion of vessel 12 to distribute the flue gas stream substantially evenly over the cross-sectional area of flue gas chamber 24, as indicated in FIG. 1 by arrows 36. Caps described in detail below but not shown in detail in FIG. 1 shield direct entry of flue gas into cyclonic separators 30. The flue gas stream enters the upstream ends of cyclonic separators 30, which impart the substantially smooth or laminar gas flow with a substantially swirling or vortex-like flow pattern represented in FIG. 1 by arrows 38. As the gas flow follows these swirling or spiral-shaped flow paths downward through cyclonic separators 30, centrifugal forces urge the catalyst fines radially outward and against the inner annular walls of separators 30. As further indicated in FIG. 1 by arrows 40, the majority and, perhaps, the vast majority of the catalyst fines flow through sidewall orifices or check valve openings provided in separators 30, which are not shown in FIG. 1 for clarity and described in detail below. The fines passing through the check valve openings are carried by a relatively small amount, e.g., about 3-5%, by volume, of the flue gas commonly referred to the "underflow" into entrained solids chamber 28. The fines-laden underflow is then discharged from separator 10 through entrained solids outlet 18 indicated in FIG. 1 by arrows 42, which may be fluidly coupled to entrained solids chamber 28 by way of a central solids drain pipe 44. Depending upon the particular application in which separator 10 is employed, the fines-laden underflow may then be supplied to a fourth stage filter for further particulate removal or, instead, reinjected to location downstream of vessel 12.

As gas flow is forced through each cyclonic separator 30, centrifugal forces urge catalyst fines radially outwardly and away from the separator centerline, as described above. In so doing, the catalyst fines are removed from the innermost core gas flow conducted through the radial center of cyclonic separators 30. This core gas flow, which is substantially particle free and thus referred to herein as the "clean gas flow," is discharged from the downstream ends of cyclonic separators 30, into clean gas chamber 26, and ultimately exits vessel 12 through clean gas outlet 16 represented in FIG. 1 by arrows 46. In embodiments wherein temperature of the flue gas stream is greater than about 760° C., commonly referred to as "hot TSS applications", the clean gas may be supplied to a turbine included within power recovery expander unit. In this case, removal of the fines from the gas stream minimizes erosion of the turbine blades and thus prolongs the operational lifespan of the turbine. Alternatively, clean gas that is from flue gas that is greater than about 340° C., but less than about 760° C., commonly referred to as "low temperature TSS applications", may be supplied to a stack for exhaustion to atmosphere. In this case, removal of the fines decreases the amount of particulate matter in the exhaust, which may be required to satisfy environmental regulations depending upon the particular geographical region and regulatory authority governing the operation of the FCC unit or other system in which the solids-gas separator 10 is employed.

Figure 2:
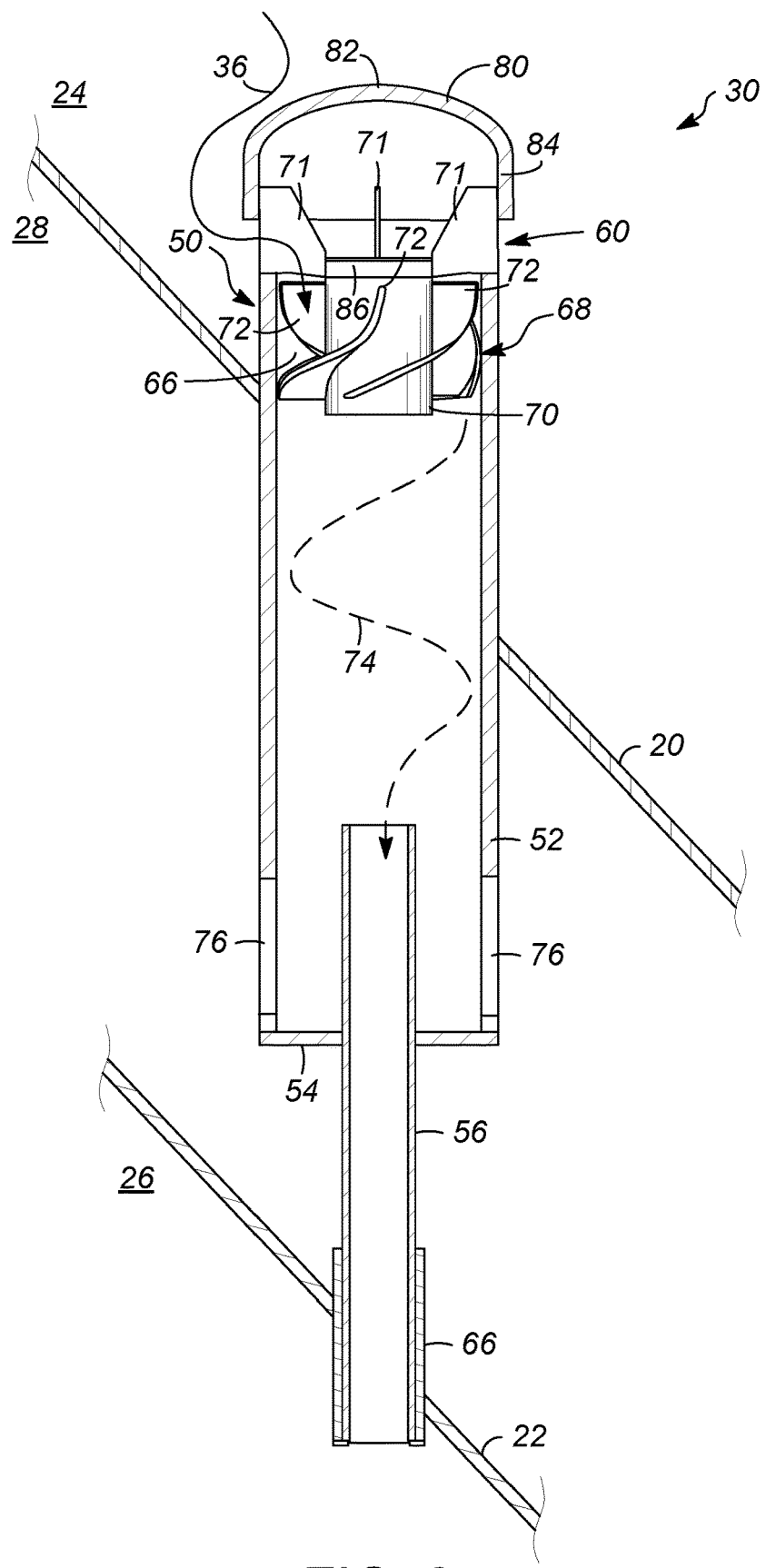
FIG. 2 is a cross-sectional view of a portion of the gas-solids separator shown in FIG. 1 illustrating in greater detail an exemplary embodiment of one of the cyclonic separators.

FIG. 2 is a cross-sectional view of a portion of solids-gas separator 10 taken through one cyclonic separator 30 and illustrated in accordance with an exemplary embodiment. Cyclonic separator 30 includes among other components a separator flowbody 50, which extends across entrained solids chamber 28 to fluidly couple the flue gas chamber 24 to the clean gas chamber 26. In the illustrated example, the separator flowbody 50 is comprised of three components, namely, a cyclone barrel 52, a barrel end plate 54, and a gas outlet tube 56. As indicated in FIG. 2, cyclone barrel 52 conveniently assumes the form of an elongated pipe having an upper or upstream end, which extends through an opening provided in upstream tube sheet 20 and projects upwardly therefrom; and a lower or downstream end, which projects downwardly into the entrained solids chamber 28. The cyclone barrel is fluidly coupled to the flue gas inlet 14. Similarly, gas outlet tube 56 may assume the form of an elongated pipe having an outer diameter less than the inner diameter of cyclone barrel 52; e.g., in one embodiment, the inner diameter of outlet tube 56 may be about one half to one third the inner diameter of cyclone barrel 52. Gas outlet tube 56 is fluidly coupled to the downstream end of cyclone barrel 52 and extends downwardly therefrom through an opening provided in downstream tubesheet 22 into clean gas chamber 26. The gas outlet tube 56 is centrally disposed in the cyclone barrel 52 and fluidly coupled at a downstream end to the clean gas chamber 26. The gas outlet tube 56 may extend through the central opening provided in barrel end plate 54 and into the downstream end portion of cyclone barrel 52. Finally, barrel end plate 54 assumes the form of an annular plate or disc, which encloses at least in substantial part the downstream end of cyclone barrel 52. In low temperature TSS applications, barrel end plate 54 may be rigidly joined between cyclone barrel and gas outlet tube 56; e.g., the outer circumferential edge of barrel end plate 54 may be joined; e.g., welded, to the downstream end of cyclone barrel 52, and inner circumferential edge of end plate 54 may be joined; e.g., welded, to an outer circumferential surface of gas outlet tube 56. However, in hot TSS applications, barrel end plate 54 may be joined to only one of cyclone barrel 52 and gas outlet tube 56, while a small annular clearance is provided between end plate 54 and the other of barrel 52 and outlet tube 56 to accommodate differences in thermal expansion.

A swirl vane 68 is positioned in and/or across an upper or upstream end of cyclone barrel 52. A plurality of swirl blades 72 extend radially outward from a hub 70 and wrap or twist tangentially around the longitudinal axis of the cyclonic separator 30. The swirl blades 72 have upstream ends disposed circumferentially around the hub 70. The swirl blades 72 are disposed in an annular space 66 defined between an outer surface of the hub 70 and an inner surface of the cyclone barrel 52. As gas flow is forced through cyclone barrel 52, swirl vane 68 imparts the gas flow with a swirling or vortex-type flow pattern, as generically represented in FIG. 2 by dashed line 74. As previously indicated, such a swirling or spiral-type flow pattern generates centrifugal forces, which urge the catalyst fines entrained within the gas stream radially outward from the centerline of cyclone barrel 52 and against the interior wall of barrel 52 thereby facilitating the removal of the fines through one or more solids outlets 76, such as check valve openings, described below. The swirl vane 68 with the swirl blades 72 may be a singly cast piece.

The cyclonic separator 30 includes one or more solids outlets 76 comprising a check valve opening peripherally disposed in and through the downstream end of cyclone barrel 52 radially adjacent the penetrating section of gas outlet tube 56. The term "check valve opening," as appearing herein, is defined as an opening or orifice that permits solids-laden gas flow in substantially one direction under normal operating conditions of the gas-solids separator and, thus, prevents undesired backflow from entering cyclone barrel 52 in a manner similar to a check valve. Backflow through the check valve opening or openings is prevented or at least substantially impeded by selecting the total cross-sectional flow area of the check valve opening(s) along with other parameters, such as the difference in inner diameters between cyclone barrel 52 and outlet tube 56, to ensure a relatively high pressure drop when transitioning from the interior of cyclone barrel 52 to entrained solids chamber 28. The solids outlet 76 is fluidly connected to the entrained solids outlet 18 (FIG. 1). Thus, during operation of cyclonic separator 30, the underflow-entrained fines are permitted to exit the downstream end of barrel 52, flow through terminal solids outlet 76, and enter entrained solids chamber 28 for subsequent removal via solids drain pipe 44 and entrained solids outlet 18 (FIG. 1). By comparison, the relatively clean core gas flow flows through the gas outlet tube 56, into the clean gas chamber 26, and is ultimately discharged from the solids-gas separator 10 via the clean gas outlet 16 (FIG. 1).

It has been discovered that, over prolonged periods of continuous operation, severe erosion of the connection between swirl blades 72 and the hub 70 can occur. To prevent direct impact of catalyst fines onto the swirl blades 72, a cap 80 is installed upstream of the swirl vane 68. The cap 80 extends radially at least as far as the extent of the entire swirl vane 68 and radially across an upstream end of all of the swirl blades 72. The cap 80 extends radially beyond the hub but across the annular space 66 between the hub and the cyclone barrel 52. Consequently, solids laden gas from upstream of the cyclonic separator 30 may not enter the cyclone barrel directly but indirectly by going around the cap 80 as shown by arrow 36 in FIG. 2. The cap 80 has a closed roof 82, impervious to solids, which may be hemispherical and a cylindrical side wall 84 extending downstream of the roof 82. The diameter of the cap 80, preferably the inside diameter of the outer wall 84 is larger than the outer diameter of the cyclone barrel 52 to ensure that the flow of the incoming particle laden flue gas is changed to a radial direction before contacting the swirl vane 68 in the annular space 66.

Lugs 71 hold the cap 80 in place above the swirl vane 68. Lugs 71 may be secured such as by welding at their inner downstream end to an extension 86 of the hub 70 that extends upstream of the swirl vane 68. The extension 86 attaches to the hub 70. The lugs 71 are also secured such as by welding at a downstream outer end to the cyclone 52 barrel and at a upstream outer end to the side wall 84 of the cap 80. The downstream end of the side wall 84 extends to a window 60 defined downstream of the side wall 84 upstream of the cyclone barrel 52 and between the lugs 71. The window 60 allows access to the swirl blades 72 and fluidly couples the flue gas inlet 14 to the swirl vane 68 in the annular space 66. The hub 70 has a closed, flat upstream end downstream of the cap 80 provided on the extension 86. The window 60 is sized such that the spacing between the downstream end of the side wall 84 and the upstream end of the cyclone barrel 52 defines a cylindrical area that is at least twice the cross sectional area between the hub 70 and the cyclone barrel 52 that defines the annular space 66.

Figure 3:
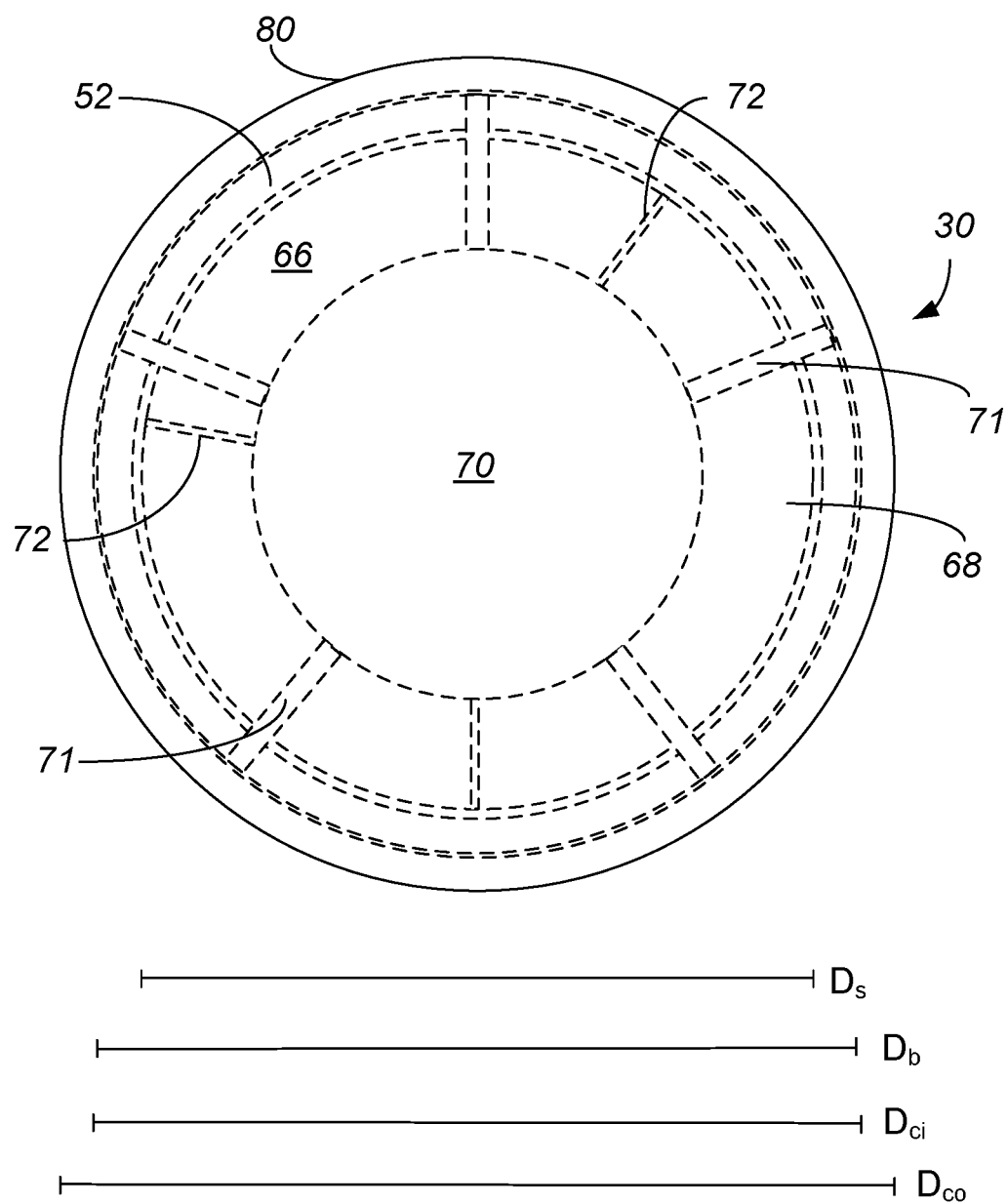
FIG. 3 is a plan view of a portion of the gas-solids separator shown in FIG. 1.

FIG. 3 is a top plan view of the cyclonic separator 30 of FIG. 2 showing that the cap 80 extends radially across an upstream end of the swirl vane 68. The cap 80 has an outer diameter $D_{co}$ that extends as far as an outer diameter defined by swirl blades 72 $D_s$ to prevent direct impingement of flue gas onto upstream edges of the swirl blades 72. Entry into the annular space 66 between the cyclone barrel 52 and the hub 70 cannot be achieved directly but by going around the cap 80 and between the lugs 71. Indeed, the outer diameter $D_{co}$ of the cap 80 is greater than the outer diameter of the cyclone barrel 52 $D_b$. Preferably, the inner diameter $D_{ci}$ of the cap 80 is greater than the outer diameter of the cyclone barrel 52 $D_b$.

The cross sectional area of the annular space 66 between the hub 70 and the cyclone barrel 52 is visible in FIG. 3. The window 60 is sized such that the spacing between the downstream end of the side wall 84 and the upstream end of the cyclone barrel 52 (FIG. 2) defines a cylindrical area that is at least twice the cross sectional are of the annular space 66.

In operation, the solid-laden flue gas stream represented by arrow 36 enters the flue gas inlet 14 to the vessel 12 and travels through the flue gas chamber 24 to a particular cyclonic separator 30. The caps 80 shield the cyclonic separator 30 from direct entry of flue gas into the swirl vane 68 but limits access of the solid-laden gas to the swirl vane 68 but by around a downstream end of the cap 80. The solid-laden gas contacts the swirl blades 72 which induce the solid laden gas to swirl in a cyclone and separate solids from the gas by centrifugal acceleration. The solids 42 exit the vessel 12 through the entrained solids outlet 18, and the clean gas 46 exits the vessel through the clean gas outlet 16.

Specific Embodiments

While the following is described in conjunction with specific embodiments, it will be understood that this description is intended to illustrate and not limit the scope of the preceding description and the appended claims.

A first embodiment of the invention is a cyclonic separator, comprising a cyclone barrel; a swirl vane positioned in an upstream end of the cyclone barrel; a gas outlet centrally disposed in a downstream end of the cyclone barrel; a solids outlet peripherally disposed in the downstream end of the cyclone barrel; and a cap extending radially across an upstream end of the swirl vane. An embodiment of the invention is one, any or all of prior embodiments in this paragraph up through the first embodiment in this paragraph further comprising a plurality of swirl blades wrapped around a hub positioned in the upstream end of the cyclone barrel and the cap extends radially across an upstream end of all of the swirl vanes. An embodiment of the invention is one, any or all of prior embodiments in this paragraph up through the first embodiment in this paragraph wherein the swirl blades have upstream ends disposed circumferentially around the hub. An embodiment of the invention is one, any or all of prior embodiments in this paragraph up through the first embodiment in this paragraph wherein the cap has a side wall that extends to a window which allows access to the swirl blades. An embodiment of the invention is one, any or all of prior embodiments in this paragraph up through the first embodiment in this paragraph wherein a downstream end of the side wall is positioned upstream of the swirl vane to define the window. An embodiment of the invention is one, any or all of prior embodiments in this paragraph up through the first embodiment in this paragraph wherein the swirl blades are disposed in an annular space between the hub and the cyclone barrel. An embodiment of the invention is one, any or all of prior embodiments in this paragraph up through the first embodiment in this paragraph further comprising a lug secured to the hub and the cap to hold the cap in place above the hub. An embodiment of the invention is one, any or all of prior embodiments in this paragraph up through the first embodiment in this paragraph wherein the hub has a closed end downstream of the cap. An embodiment of the invention is one, any or all of prior embodiments in this paragraph up through the first embodiment in this paragraph wherein the hub has a flat top end. An embodiment of the invention is one, any or all of prior embodiments in this paragraph up through the first embodiment in this paragraph wherein the hub extends above an upstream end of the swirl blades. An embodiment of the invention is one, any or all of prior embodiments in this paragraph up through the first embodiment in this paragraph wherein the cap has a hemispherical roof.

A second embodiment of the invention is a gas-solids separator, comprising a vessel having a flue gas inlet, an entrained solids outlet, and a clean gas outlet; an upstream tube sheet and a downstream tube sheet within the vessel and defining therewith a gas inlet chamber fluidly coupled to the flue gas inlet, an entrained solids chamber fluidly coupled to the entrained solids outlet, and a clean gas chamber fluidly coupled to the clean gas outlet; and a cyclonic separator, comprising a cyclone barrel extending into the entrained solids chamber and fluidly coupled to the flue gas inlet; a swirl vane positioned in an upstream end of the cyclone barrel; a gas outlet centrally disposed in a downstream end of the cyclone barrel and fluidly coupling the gas inlet chamber to the clean gas chamber; a solids outlet peripherally disposed in the downstream end of the cyclone barrel and fluidly connected to the entrained solids outlet; and a cap extending radially above an upstream end of the swirl vane. An embodiment of the invention is one, any or all of prior embodiments in this paragraph up through the second embodiment in this paragraph wherein the cyclonic separator further comprising a plurality of swirl blades wrapped around a hub positioned in the upstream end of the cyclone barrel and the cap extends radially above upstream ends of all of the swirl blades disposed circumferentially around the hub. An embodiment of the invention is one, any or all of prior embodiments in this paragraph up through the second embodiment in this paragraph wherein the cap of the cyclonic separator has a side wall that has a downstream end spaced from the swirl blades to provide a window which fluidly couples the flue gas inlet to the swirl blades. An embodiment of the invention is one, any or all of prior embodiments in this paragraph up through the second embodiment in this paragraph wherein the swirl blades of the cyclonic separator are disposed in an annular space between the hub and the cyclone barrel. An embodiment of the invention is one, any or all of prior embodiments in this paragraph up through the second embodiment in this paragraph wherein the cyclonic separator further comprises a lug secured to the hub and the cap to hold the cap in place upstream of the hub. An embodiment of the invention is one, any or all of prior embodiments in this paragraph up through the second embodiment in this paragraph wherein the cap of the cyclonic separator has a hemispherical top.

A third embodiment of the invention is a process for separating solids from gas comprising directing a solid-laden gas to a cyclonic separator; shielding direct entry into the cyclonic separator that includes swirl vane with a cap; limiting the solid-laden gas access to the swirl blades but around a downstream end of the cap; contacting the solid-laden gas with swirl blades which induce the solid laden gas to swirl in a cyclone; and separating solids from the gas by centripetal acceleration. An embodiment of the invention is one, any or all of prior embodiments in this paragraph up through the third embodiment in this paragraph further comprising directing the solid-laden gas from a flue gas inlet to a vessel to the cyclonic separator in the vessel, and wherein the solids exit the vessel through an entrained solids outlet, and the gas exits the vessel through a clean gas outlet.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A cyclonic separator, comprising:
   a cyclone barrel;
   a swirl vane positioned in an upstream end of the cyclone barrel;
   a gas outlet centrally disposed in a downstream end of the cyclone barrel;
   a solids outlet peripherally disposed in the downstream end of the cyclone barrel;
   a cap extending radially across an upstream end of the swirl vane;
   a plurality of swirl blades wrapped around a hub positioned in the upstream end of the cyclone barrel and the cap extends radially across an upstream end of all of the swirl vanes; and
   a lug secured to the hub and the cap to hold the cap in place above the hub.

2. The cyclonic separator of claim 1 wherein said swirl blades have upstream ends disposed circumferentially around the hub.

3. The cyclonic separator of claim 1 wherein said cap has a side wall that extends to a window which allows access to said swirl blades.

4. The cyclonic separator of claim 3 wherein a downstream end of said side wall is positioned upstream of said swirl vane to define said window.

5. The cyclonic separator of claim 1 wherein said swirl blades are disposed in an annular space between the hub and the cyclone barrel.

6. The cyclonic separator of claim 1 wherein said hub has a closed end downstream of the cap.

7. The cyclonic separator of claim 1 wherein said hub has a flat top end.

8. The cyclonic separator of claim 1 wherein said hub extends above an upstream end of said swirl blades.

9. The cyclonic separator of claim 1 wherein said cap has a hemispherical roof.

10. A gas-solids separator, comprising:
a vessel having a flue gas inlet, an entrained solids outlet, and a clean gas outlet;
an upstream tube sheet and a downstream tube sheet within the vessel and defining therewith a gas inlet chamber fluidly coupled to the flue gas inlet, an entrained solids chamber fluidly coupled to the entrained solids outlet, and a clean gas chamber fluidly coupled to the clean gas outlet; and
a cyclonic separator, comprising:
a cyclone barrel extending into the entrained solids chamber and fluidly coupled to the flue gas inlet;
a swirl vane positioned in an upstream end of the cyclone barrel;
a gas outlet centrally disposed in a downstream end of the cyclone barrel and fluidly coupling the gas inlet chamber to the clean gas chamber;
a solids outlet peripherally disposed in the downstream end of the cyclone barrel and fluidly connected to the entrained solids outlet;
a cap extending radially above an upstream end of the swirl vane;
a plurality of swirl blades wrapped around a hub positioned in the upstream end of the cyclone barrel and the cap extends radially above upstream ends of all of the swirl blades disposed circumferentially around the hub; and
a lug secured to the hub and the cap to hold the cap in place upstream of the hub.

11. The gas-solids separator of claim 10 wherein said cap of said cyclonic separator has a side wall that has a downstream end spaced from the swirl blades to provide a window which fluidly couples said flue gas inlet to said swirl blades.

12. The gas-solids separator of claim 10 wherein said swirl blades of said cyclonic separator are disposed in an annular space between the hub and the cyclone barrel.

13. The gas-solids separator of claim 10 wherein said cap of said cyclonic separator has a hemispherical top.

* * * * *